(12) United States Patent
Levy

(10) Patent No.: US 9,954,405 B2
(45) Date of Patent: *Apr. 24, 2018

(54) ELECTROMAGNETIC SYSTEM WITH MAGNETICALLY COUPLED ROTORS

(71) Applicant: HEALEY MAGNETICS, LLC, Atlanta, GA (US)

(72) Inventor: Evan Levy, Atlanta, GA (US)

(73) Assignee: HEALEY MAGNETS, LLC, Atlanta, GA (US)

( * ) Notice: Subject to any disclaimer, the term of this patent is extended or adjusted under 35 U.S.C. 154(b) by 301 days.

This patent is subject to a terminal disclaimer.

(21) Appl. No.: 14/886,592

(22) Filed: Oct. 19, 2015

(65) Prior Publication Data

US 2016/0043600 A1 Feb. 11, 2016

Related U.S. Application Data

(63) Continuation of application No. 13/800,516, filed on Mar. 13, 2013, now Pat. No. 9,197,117.

(Continued)

(51) Int. Cl.
| | |
|---|---|
| H02K 1/27 | (2006.01) |
| H02K 3/28 | (2006.01) |
| H02K 16/02 | (2006.01) |
| H02K 16/00 | (2006.01) |
| H02K 51/00 | (2006.01) |
| H02K 7/11 | (2006.01) |
| H02K 49/10 | (2006.01) |

(52) U.S. Cl.
CPC ............. *H02K 1/2786* (2013.01); *H02K 3/28* (2013.01); *H02K 7/11* (2013.01); *H02K 16/00* (2013.01); *H02K 16/02* (2013.01); *H02K 49/102* (2013.01); *H02K 51/00* (2013.01); *Y02E 10/725* (2013.01)

(58) Field of Classification Search
CPC .......... H02K 1/2786; H02K 3/28; H02K 7/11; H02K 16/00; H02K 16/02; H02K 49/102; H02K 51/00
USPC ........................................................ 310/114
IPC .............................................. H02K 1/27,16/02
See application file for complete search history.

(56) References Cited

U.S. PATENT DOCUMENTS

| | | |
|---|---|---|
| 2,243,555 A | 5/1941 | Faus |
| 2,722,617 A | 11/1955 | Cluwen et al. |

(Continued)

FOREIGN PATENT DOCUMENTS

| | | |
|---|---|---|
| DE | 10 2008 060284 A1 | 6/2010 |
| WO | 2010/089465 A1 | 8/2010 |

OTHER PUBLICATIONS

"Spinning Dipoles: Interaction of Two Spinning Dipoles," http://jcmax/pbworks.com/w/page/4617991/SpinningDipoles (Aug. 2008).

(Continued)

*Primary Examiner* — John K Kim
(74) *Attorney, Agent, or Firm* — Kacvinsky Daisak Bluni PLLC; Douglas E. Ringel

(57) ABSTRACT

A magnetic rotor arrangement is provided, having a primary rotor including an array of magnets arranged to provide alternating polarity around the outside of the primary rotor and at least one auxiliary rotor including an array of magnets arranged to provide alternating polarity around the outside of the auxiliary rotor. The primary rotor and each auxiliary rotor are arranged such that when the primary rotor is rotated, the rotation of the primary rotor magnetically induces rotation of each auxiliary rotor.

18 Claims, 4 Drawing Sheets

Related U.S. Application Data

(60) Provisional application No. 61/765,448, filed on Feb. 15, 2013, provisional application No. 61/635,914, filed on Apr. 20, 2012.

(56) References Cited

U.S. PATENT DOCUMENTS

| | | | | |
|---|---|---|---|---|
| 3,523,204 | A | * | 8/1970 | Rand .................. H02K 49/06 310/103 |
| 3,730,488 | A | | 5/1973 | Gardner, Jr. |
| 4,563,604 | A | | 1/1986 | Xuan |
| 4,850,821 | A | * | 7/1989 | Sakai .................. F04D 13/14 310/152 |
| 5,569,967 | A | | 10/1996 | Rode |
| 6,047,456 | A | * | 4/2000 | Yao .................. H02K 49/102 29/407.05 |
| 7,024,963 | B2 | * | 4/2006 | French .................. F16C 39/063 74/665 F |
| 7,898,134 | B1 | * | 3/2011 | Shaw .................. H02K 1/148 310/112 |
| 9,197,117 | B2 | * | 11/2015 | Levy .................. H02K 16/00 |
| 2002/0158531 | A1 | | 10/2002 | Aritaka |
| 2004/0041479 | A1 | | 3/2004 | French |
| 2009/0047155 | A1 | | 2/2009 | Hsieh |
| 2009/0189470 | A1 | | 7/2009 | McClellan |
| 2009/0243414 | A1 | | 10/2009 | Lamas |
| 2013/0278102 | A1 | | 10/2013 | Levy |
| 2016/0043600 | A1 | * | 2/2016 | Levy .................. H02K 16/00 310/114 |

OTHER PUBLICATIONS

"Why Are There So Many Different Shapes of Magnets," http://strong-rare-earth-magnets.com/why-are-there-so-many-different-shapes-of-magnets (Jul. 2012).

International Search Report (PCT/ISA/210) and Written Opinion (PCT/ISA/237) of the International Searching Authority, dated Nov. 21, 2014, in connection with the International Application No. PCT/US2013/037158.

International Preliminary Report on Patentability (PCT/IB/373), dated Dec. 4, 2014 in connection with International Application No. PCT/US2013/037158.

* cited by examiner

ELECTROMAGNETIC SYSTEM WITH MAGNETICALLY COUPLED ROTORS

CROSS REFERENCE TO RELATED APPLICATIONS

This application is a continuation of U.S. patent application Ser. No. 13/800,516, filed Mar. 13, 2013, which claims the benefit of U.S. Provisional Application No. 61/765,448, filed Feb. 15, 2013, and U.S. Provisional Application No. 61/635,914, filed Apr. 20, 2012, the disclosures of which are hereby incorporated herein by reference.

TECHNICAL FIELD

The present invention relates to the field of magnetic rotors, for example magnetic rotors as may be useful in rotating machines, such as electric generators and electric motors.

BACKGROUND OF THE INVENTION

There are many types of rotating machines. These machines can be used as generators with mechanical energy being translated into electricity through relative movement between a wire and magnetic fields. These magnetic fields can be produced through electromagnets and/or permanent magnets. A known fact is that magnets are dipoles, meaning that each magnet has a positive pole and a negative pole. Most rotating machines that utilize permanent magnets utilize only one polarity side of the permanent magnets when they generate or use electricity.

SUMMARY OF THE INVENTION

Described herein is a novel magnetic rotor arrangement that creates a "virtual gear" out of the outer flux fields. The magnetic forces on the outside of one rotating magnetic rotor rotate at least one auxiliary magnetic rotor. When this arrangement is used in a generator, it may provide more power density than conventional designs and/or may be capable of generating more electricity from the same applied mechanical force, thereby creating a more efficient generator and/or alternator suitable for use in a wide range of fields such as industrial applications, automotive uses, transportation systems, hydroelectric generators, ocean wave generators, wind turbine generators, power plants, etc. As just one example, this type of generator may be useful for recharging batteries, as different rotors may produce electrical waveforms that can more efficiently displace cathode ions in rechargeable batteries. Magnetic rotor arrangements as described herein also may prove useful in planetary gear systems, particle accelerators, physics experiments, nanotechnology, medical applications, centrifuges and gyroscopes, military, rocket and defense systems, information storage and transmission, and magnetic levitation in transporting people and goods. These magnetic rotor arrangements also may be used in toys and educational devices. A rotating machine with a magnetic rotor arrangement as described herein also can be used as a motor, which may provide more power density and/or different capabilities than conventional motors (such as different capabilities with respect to torque, acceleration and/or horsepower). Magnetic rotor arrangements as described herein also can be used in combination, with, for example, a motor and generator within one machine.

In one embodiment, a magnetic rotor arrangement is provided, comprising a primary rotor comprising an array of permanent magnets, wherein the magnets of the primary rotor are arranged to provide alternating polarity around the outside of the primary rotor, and at least one auxiliary rotor comprising an array of permanent magnets, wherein the magnets of each auxiliary rotor are arranged to provide alternating polarity around the outside of the auxiliary rotor. Each auxiliary rotor is positioned on the outside of the primary rotor such that the array of permanent magnets of each auxiliary rotor is positioned to be magnetically influenced by the array of permanent magnets of the primary rotor. The primary rotor and each auxiliary rotor are arranged such that when the primary rotor is rotated, the rotation of the primary rotor magnetically induces rotation of each auxiliary rotor.

The array of permanent magnets of the primary rotor may generally form an equiangular polygon and/or an equilateral polygon. The polygon may have an even number of sides. For example, the array of permanent magnets of the primary rotor may form a hexagon, octagon, decagon, dodecagon, or any other suitable shape. Each side of the polygon of the primary rotor may be formed by one permanent magnet or more than one permanent magnet. The array of permanent magnets of the primary rotor may generally form a circle. In such a case, each permanent magnet in the array of permanent magnets of that primary rotor may form an arc of the circle.

The magnetic rotor arrangement may comprise one or a plurality of auxiliary rotors. The number of auxiliary rotors may be equal to, less than, or more than the number of permanent magnets in the primary rotor.

The array of permanent magnets of each auxiliary rotor may generally form an equiangular polygon and/or an equilateral polygon. As with the primary rotor, the polygon may have an even number of sides. For example, the array of permanent magnets of each auxiliary rotor may form a hexagon, octagon, decagon, dodecagon, or any other suitable shape. Each side of the polygon of an auxiliary rotor may be formed by one permanent magnet or more than one permanent magnet. The array of permanent magnets of an auxiliary rotor may generally form a circle. In such a case, each permanent magnet in the array of permanent magnets of that auxiliary rotor may form an arc of the circle.

The primary rotor and each auxiliary rotor may be arranged such that when the primary rotor is rotated by one revolution, the rotation of the primary rotor magnetically induces rotation of each auxiliary rotor by one revolution. Alternatively, the primary rotor and each auxiliary rotor may be arranged such that when the primary rotor is rotated by one revolution, the rotation of the primary rotor magnetically induces rotation of each auxiliary rotor by more than one revolution or by less than one revolution.

The primary rotor and each auxiliary rotor may be arranged such that when the primary rotor is rotated, the rotation of the primary rotor magnetically induces rotation of each auxiliary rotor at a non-constant angular speed. Alternatively, the primary rotor and each auxiliary rotor may be arranged such that when the primary rotor is rotated, the rotation of the primary rotor magnetically induces rotation of each auxiliary rotor at a constant angular speed.

The positioning of the auxiliary rotor(s) on the outside of the primary rotor may be in any suitable arrangement. In one arrangement, the primary rotor is centrally positioned, and the auxiliary rotors are positioned around the periphery of the primary rotor. In another arrangement, all of the rotors (the primary rotor and the auxiliary rotor(s)) are positioned in a linear arrangement such that their axes are all generally on a common line. In yet another arrangement, the rotors (the primary rotor and the auxiliary rotor(s)) are positioned in an array or grid pattern. In yet another arrangement, the rotors are positioned to form a three-dimensional rotor array or arrangement.

The magnetic rotor arrangement may be implemented in a generator, with the primary rotor arranged to rotate around a fixed primary stator and with each auxiliary rotor arranged to rotate around a fixed auxiliary stator. Thus, for example, a generator for generating electric current may be provided, comprising a primary generating assembly and a plurality of auxiliary generating assemblies. The primary generating assembly comprises a fixed primary stator surrounded by a primary rotor comprising an array of permanent magnets, wherein the magnets of the primary rotor are arranged to provide alternating polarity around the outside of the primary rotor. The auxiliary generating assemblies are positioned around the primary rotor, with each auxiliary generating assembly comprising a fixed auxiliary stator surrounded by an auxiliary rotor comprising an array of permanent magnets, wherein the magnets of each auxiliary rotor are arranged to provide alternating polarity around the outside of the auxiliary rotor. Each auxiliary rotor may be positioned on the outside of the primary rotor such that the array of permanent magnets of the auxiliary rotor is positioned to be magnetically influenced by the array of permanent magnets of the primary rotor. The primary rotor and each auxiliary rotor may be arranged such that when the primary rotor is rotated, the rotation of the primary rotor magnetically induces rotation of each auxiliary rotor.

In one embodiment, a generator as described herein comprises a primary generating assembly with flux-induced auxiliary generating assemblies. The motion of the core hub or primary rotor induces motion in auxiliary hubs or rotors through alternating polarity flux fields.

In one embodiment, the primary generating assembly comprises a fixed primary stator surrounded by a primary rotor comprising an array of permanent magnets. The magnets of the primary rotor are arranged in alternating fashion around the primary stator, with adjacent permanent magnets having their poles oppositely oriented. Auxiliary generating assemblies are positioned around the primary rotor, with each auxiliary generating assembly comprising a fixed auxiliary stator surrounded by an auxiliary rotor comprising an array of permanent magnets. The magnets of each auxiliary rotor are arranged in alternating fashion around their respective stator, with adjacent permanent magnets having their poles oppositely oriented.

The core hub or primary rotor may be attached to a gear, pulley or other attachment and may be driven by any one of a number of different types of motive forces, including mechanical power. For example, the primary rotor may be driven by a motor, water flow, wind, magnetic forces or electrical current. For example, an electrical current may be passed through windings inside the primary rotor to drive the primary rotor. As the core hub or primary rotor magnetic array rotates, the peripheral auxiliary arrays spin through flux-induced fields. This interaction functions like a magnetic gear as the flux fields of the magnet rotors interact. The auxiliary magnet arrays can have the same number or different number of permanent magnets as the primary magnet array. The permanent magnets may take any suitable shape.

The magnets may be arranged in differing numbers and positions around their respective stators. This can produce differing toroidal-shaped flux fields. The concept envisions both synchronized and non-synchronized rotations in auxiliary magnetic arrays caused by differing numbers of magnets and arrangements. Non-synchronized rotation may be beneficial to specific applications like charging batteries, as it produces pulsed electrical current.

The auxiliary arrays distributed around the core or primary array are rotated due to the poles being alternately faced and the mechanical motion of the core or primary array. This interaction of the flux fields causes the secondary motion of the auxiliary arrays through repulsion and attraction of the poles. Once the core or primary array begins rotating through an applied force, it causes the auxiliary arrays to begin rotating, like a magnetic gear. The rotation of the auxiliary arrays is caused by the alternate action of the poles as the magnetic rotor array turns. The force is generated by the magnetic attraction and repulsion as the polar faces of the magnets interact.

Another embodiment could utilize the auxiliary arrays at changing proximity to the core or primary array. This could be done either mechanically or through centrifugal force as the core or primary array rotates. The greater the distance the auxiliary hubs or rotors are from the primary hub or rotor, the less field strength and resistance are exerted by the auxiliary hubs on the main hub; conversely the closer the auxiliary hubs or rotors are to the primary hub or rotor, the greater the field strength and resistance are exerted by the auxiliary hubs on the main hub. Changing the proximity of auxiliary hubs or rotors to the core or primary assembly allows for less start-up resistance to rotate the primary hub or rotor from static state, which could be useful in applications such as wind turbines etc. For example, the auxiliary assemblies initially may be positioned away from the primary assembly in order to reduce resistance for start-up of the primary assembly. Once the primary rotor is rotating sufficiently, the auxiliary assemblies may be brought closer to the primary assembly.

In other embodiments, the rotors may not need to rotate fully but may vibrate and transmit a magnetic pulse or stationary wave or resonant frequency that can amplify motion over distance via magnetic flux. By selective movement and/or restriction of one or more rotors in a rotor arrangement, different forms of motion inducement can be achieved.

The magnet designs described and illustrated herein enable the creation of a "virtual gear." The magnets may be of differing size, shape or thickness, and they may be manufactured in any suitable type of material, including ferrite, alnico, rare earth, etc. They may also be comprised of electromagnets of varying materials and designs. In one example, one side of the magnet can be straight, while the opposite side of the magnet is curved, and the magnets can be arranged in the rotor so that the curved side faces inwardly and the straight side faces outwardly. The inner radius can facilitate rotation of the array of magnets around the core, which may be, for example, a fixed armature. The stators may have differing wire configurations and wire types. The holders of the rotating arrays of magnets may be of differing materials, for example aluminum, steel, nylon, ceramic, etc.

DETAILED DESCRIPTION

Figure 1:
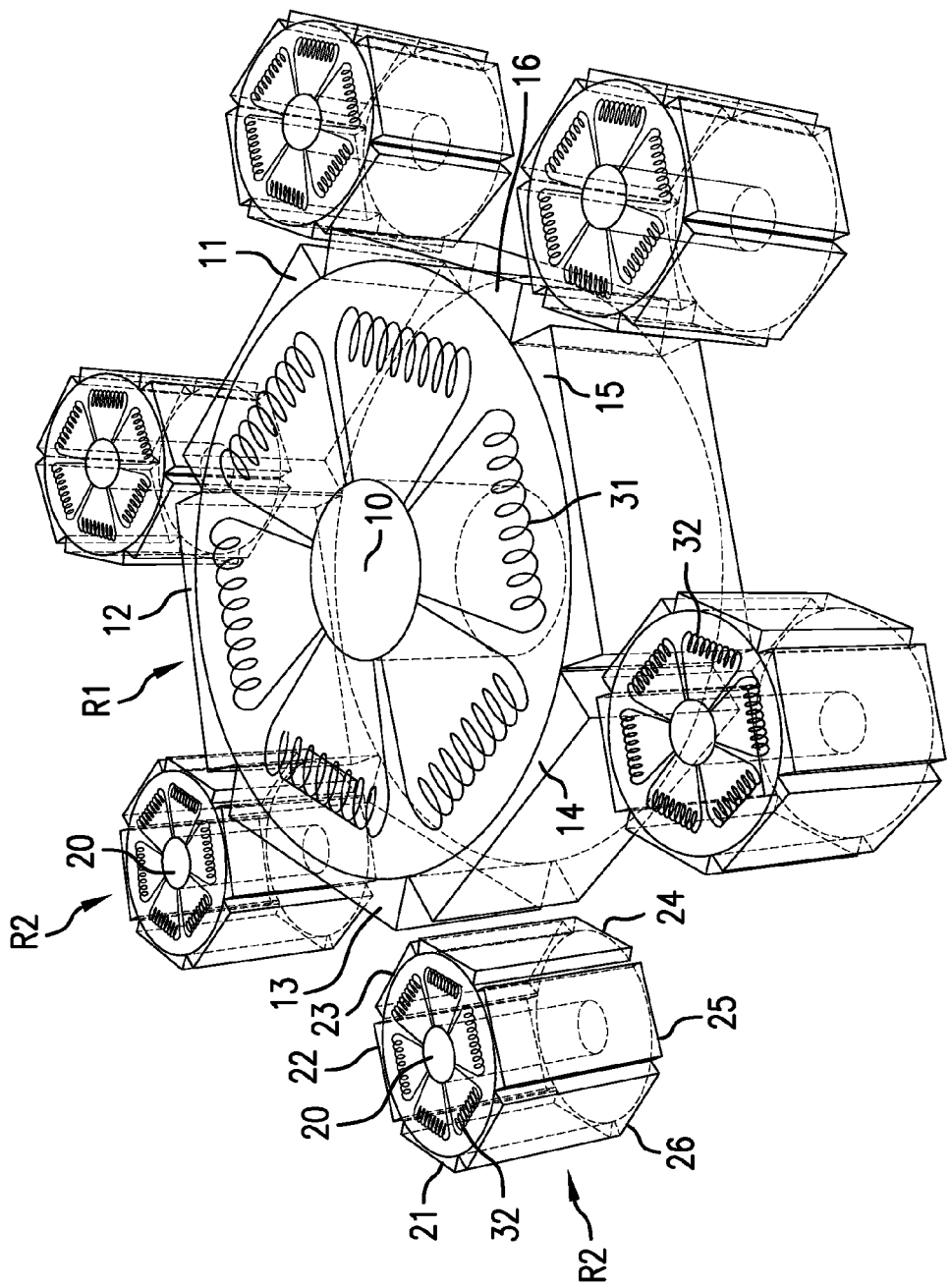
FIG. 1 shows an isometric perspective of a generator comprising a primary generator with a hexagonal magnet array and six auxiliary generators also having hexagonal magnet arrays.
Figure 2:
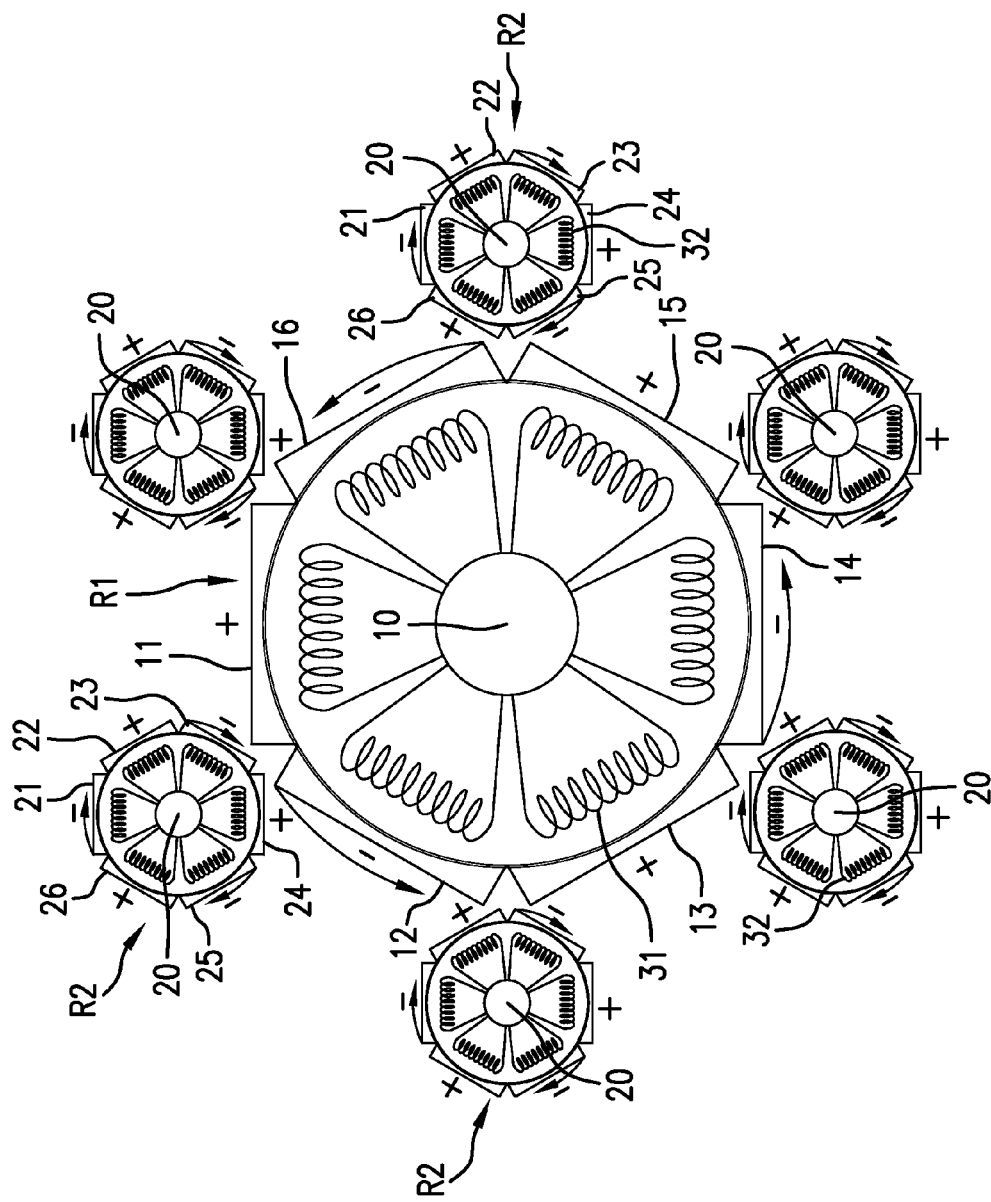
FIG. 2 shows a plan view of the generator of FIG. 1.

FIGS. 1 and 2 show a generator comprising a primary generating assembly 10 and six auxiliary generating assemblies 20. The primary generating assembly 10 comprises a primary magnetic rotor R1 arranged around a stator 31. The primary magnetic rotor R1 is in the form of a six-sided central hub, comprising an array of six permanent magnets 11, 12, 13, 14, 15, 16. Each auxiliary generating assembly 20 comprises an auxiliary magnetic rotor R2 arranged around a stator 32. Each auxiliary magnetic rotor R2 comprises an array of six permanent magnets 21, 22, 23, 24, 25, 26.

In this embodiment the coils of each stator coil 31, 32 are fixed, and each magnetic array spins. The mechanism for rotating the primary magnetic rotor R1 could be a gear or other suitable attachment to mechanical power. In alternative embodiments, the primary magnetic rotor R1 may be driven by any one of a number of different types of motive forces. For example, the primary rotor R1 may be driven by a motor, water flow, wind, magnetic forces or electrical current. For example, instead of the windings 31 being used for generation of current from the rotation of the primary rotor R1, an electrical current may be passed through windings inside the primary rotor R1 in order to drive the primary rotor R1.

FIG. 2 shows how the magnets of the magnet arrays are arranged with respect to their polarities. The magnets in an array of magnets are arranged in alternating fashion around each array with respect to the direction of facing of their poles. For example, magnet 11 of the primary array has its negative pole facing inwardly, toward the center of the assembly, and its positive pole facing outwardly. The magnets in the primary array that are adjacent to magnet 11, i.e., magnets 12 and 16, face oppositely from magnet 11. That is, each of magnets 12 and 16 has its positive pole facing inwardly, toward the center of the assembly, and its negative pole facing outwardly. The magnetic pole arrangement alternates around the main array, such that each of magnets 11, 13 and 15 has its negative pole facing inwardly and its positive pole facing outwardly, and such that each of magnets 12, 14 and 16 has its positive pole facing inwardly and its negative pole facing outwardly.

In the embodiment of FIGS. 1 and 2, the magnets in each auxiliary array are similarly alternately oriented with respect to their polarity. In particular, each of magnets 21, 23 and 25 has its positive pole facing inwardly and its negative pole facing outwardly, and each of magnets 22, 24 and 26 has its negative pole facing inwardly and its positive pole facing outwardly.

Any suitable motion-inducing force may be used to rotate the primary rotor R1 of the primary generating assembly 10. As the central core or primary rotor R1 rotates, electrical current is generated in the coils of the central or primary stator 31. In addition, the alternately charged magnetic fields generated on the outside of the primary generating assembly 10 by the primary rotor R1 act on the auxiliary magnet arrays of the auxiliary generating assemblies 20. The magnets of the primary generating assembly 10 alternately repulse and attract the magnets of the auxiliary generating assemblies 20 to create an opposing rotation in the magnetic arrays of the auxiliary generating assemblies 20.

As will be appreciated from this description and the accompanying drawings, because of the arrangement of the magnets, the rotation of the primary rotor R1 creates rotation of the auxiliary rotors R2 as well. Thus, not only is electric current generated in the stator 31 on the inside of the primary rotor R1, but electric current also is generated in each stator 32 on the inside of each auxiliary rotor R2, through the induced rotation of each auxiliary rotor R2.

The illustrated embodiment is just one example, and many variations are possible. Different embodiments include differing the numbers of magnets and differing the numbers of arrays. The shapes and relative sizes of the arrays and magnets also may be changed.

The electric current can be generated and harnessed in different fashions. In the illustrated example, the arrays all rotate around fixed stator armatures that create a current that can be captured for the creation of electricity.

The wiring of each auxiliary stator can be combined with or separated from the wiring of the central stator. Based on the arrangement of the magnets and the induced rotation, a constant speed of rotation of the primary rotor can induce a non-constant, rhythmic rotation of the auxiliary rotors. This induced motion may be used for the creation of differing sinusoidal waveforms that may be utilized for various purposes (e.g., direct/alternating current, single phase, three phase, etc.)

The rotational speed of the primary magnetic rotor can be directly synchronized with that of the auxiliary magnetic rotors or at changing speeds dependent upon the number of magnets around the main and auxiliary hubs.

Differing embodiments envision variable distances of auxiliary rotors to the primary rotor. The greater the distance the auxiliary rotors are to the primary rotor, the less the start-up resistance of rotating the primary rotor. Other embodiments envision a centrifugal or other suitable device controlling the proximity of the auxiliary rotors to the primary rotor.

As mentioned above, numerous variations of a magnetic rotor arrangement are possible in accordance with the disclosure. For example, while the embodiment of FIGS. 1 and 2 shows each successive magnet around each magnet array alternating in polarity, the array may comprise a plurality of sets of magnets, with the magnets in each set being arranged with the same polarity orientation, but with successive sets of magnets arranged in alternating fashion. Thus, for example, each single magnet 11, 12, 13, 14, 15, 16, 21, 22, 23, 24, 25, 26 could be replaced by a set of magnets, with the magnets in each set being arranged with the same polarity orientation. In such an embodiment, successive magnets do not alternate, but successive sets of magnets do alternate. Thus, embodiments are envisioned where adjacent magnets do not necessarily alternate in polarity, yet still resulting in the entire array of magnets providing alternating polarity around the outside of the primary and/or auxiliary rotor(s).

The embodiment of FIGS. 1 and 2 shows each of the arrays of magnets of the primary rotor and auxiliary rotors forming a hexagon, but, as mentioned above, other shapes are possible. In some embodiments, the array of permanent magnets of the primary rotor and/or auxiliary rotor(s) may generally form an equiangular polygon and/or an equilateral polygon. The polygon may have an even number of sides. For example, the array of permanent magnets of the primary rotor and/or auxiliary rotor(s) may form a hexagon, octagon, decagon, dodecagon, or any other suitable shape. Each side of the polygon of the primary rotor and/or auxiliary rotor(s) may be formed by one permanent magnet or more than one permanent magnet. The array of permanent magnets of the primary rotor and/or the auxiliary rotor(s) may generally form a circle. Thus, for example, the shape of each permanent magnet may be generally arcuate or any other suitable shape.

In one example, the primary and/or auxiliary rotor(s) may be octagonal, with one or more permanent magnets at each of the eight sides. In such an example, the polarity may alternate with each successive side around the polygon (as in the embodiment of FIGS. 1 and 2). Alternatively, for example, each side of the octagon may comprise two permanent magnets, with the magnets at each side arranged either with the same polarity orientation or with opposite polarity orientations. If arranged with opposite polarity orientations, the octagon can have sixteen polarity alternations around the perimeter of the octagon. In an alternative arrangement, two adjacent sides of the octagon can be arranged with the same polarity orientation, alternating around the octagon with every successive set of two sides. In this alternative, the octagon has four polarity alternations around the perimeter of the octagon. As can be appreciated from this description, the number of polarity alternations around the perimeter of a rotor can be the same as or different from the number of sides of the rotor, and the number of polarity alternations around the perimeter of a rotor can be the same as or different from the number of permanent magnets in the rotor.

The magnetic rotor arrangement may comprise a plurality of auxiliary rotors or, alternatively, only one auxiliary rotor. The number of auxiliary rotors may be equal to, less than, or more than the number of permanent magnets in the primary rotor.

The primary rotor and each auxiliary rotor may be arranged such that when the primary rotor is rotated by one revolution, the rotation of the primary rotor magnetically induces rotation of each auxiliary rotor by one revolution. Alternatively, the primary rotor and each auxiliary rotor may be arranged such that when the primary rotor is rotated by one revolution, the rotation of the primary rotor magnetically induces rotation of each auxiliary rotor by more than one revolution or by less than one revolution. The primary rotor and each auxiliary rotor may be arranged such that when the primary rotor is rotated, the rotation of the primary rotor magnetically induces rotation of each auxiliary rotor at a non-constant angular speed. Alternatively, the primary rotor and each auxiliary rotor may be arranged such that when the primary rotor is rotated, the rotation of the primary rotor magnetically induces rotation of each auxiliary rotor at a constant angular speed. As can be appreciated, the rotational relationship between the primary rotor and the auxiliary rotor(s) and the induced angular speed of the auxiliary rotor(s) can be varied based on the size and shape of the rotors, the positioning of the rotors, and the number of polarity alternations of the rotors.

As discussed above, a rotating machine with a magnetic rotor arrangement as described herein can be used as a motor. For example, with reference to the embodiment of FIGS. 1 and 2, instead of the windings 31 being used for generation of current from the rotation of the primary rotor R1, an electrical current may be passed through windings inside the primary rotor R1 in order to drive the primary rotor R1. The electrically-induced rotation of the primary rotor R1 in turn induces rotation of the auxiliary rotor(s) R2. The induced rotational movement of any or all of the primary rotor(s) and/or auxiliary rotor(s) may be used for driving any suitable part(s) of a machine or apparatus.

The positioning of the auxiliary rotor(s) on the outside of the primary rotor may take any of a variety of forms. In the embodiment shown in FIGS. 1 and 2, the primary rotor R1 is centrally positioned, and the auxiliary rotors R2 are positioned around the periphery of the primary rotor R1.

Figure 3:
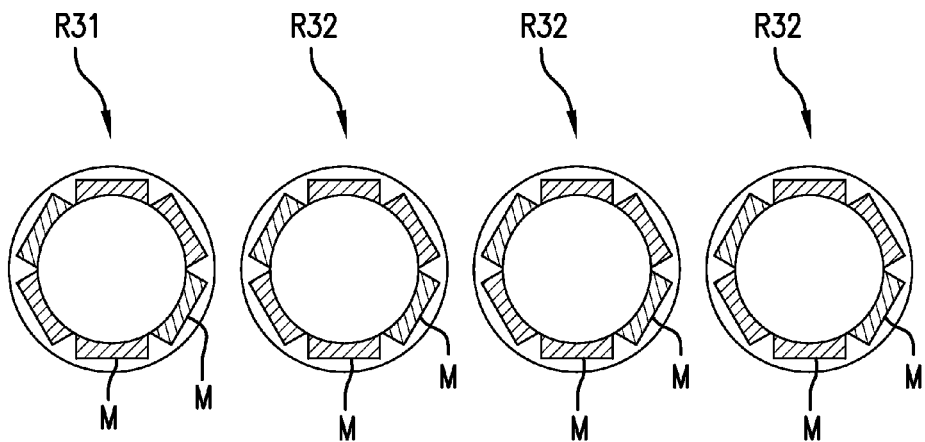
FIG. 3 shows an alternate arrangement in which the rotors are positioned in a linear arrangement.

FIG. 3 shows another embodiment, in which all of the rotors are positioned in a linear arrangement such that their axes are all generally on a common line. The first rotor is labeled R31 to designate it as the primary rotor, because the movement of the primary rotor R31 is induced by a force (e.g., electrical, mechanical or magnetic) from outside of the rotor arrangement, and movement of the primary rotor R31 induces the movement of the auxiliary rotors R32. Starting from the primary rotor R31, each rotor in turn induces the movement of the next adjacent rotor so that the movement is transferred down the line of rotors. It will be appreciated that the primary rotor may be positioned at one of the ends of the line or anywhere between the ends of the line. There may be more than one primary rotor. The magnets M may be similar to the magnets described above.

Figure 4:
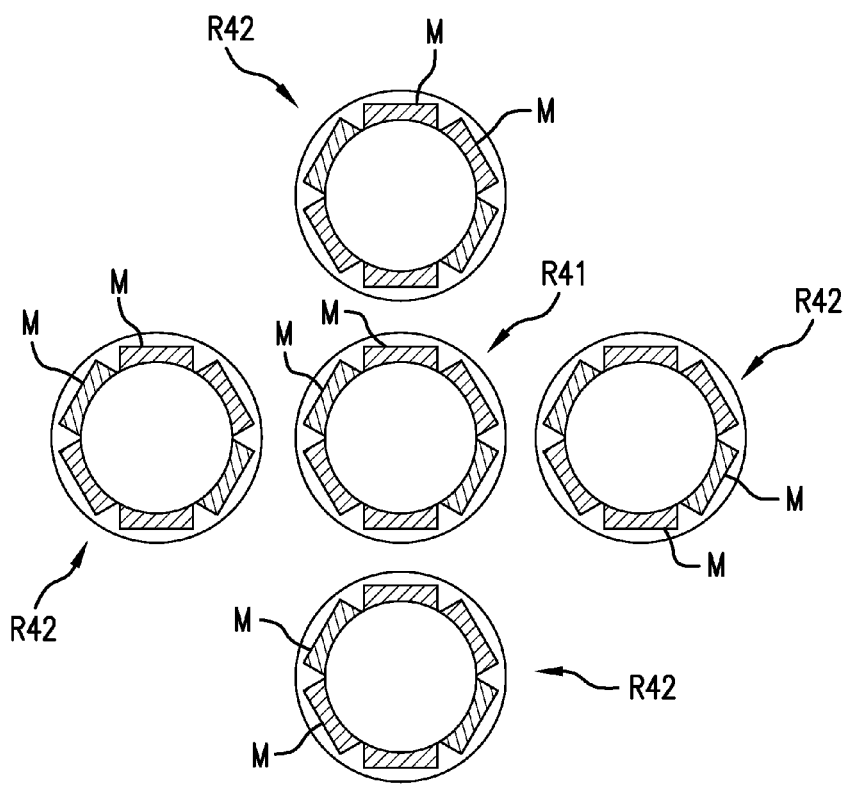
FIG. 4 shows an alternate arrangement in which the rotors are positioned in an array or grid pattern.

FIG. 4 shows another embodiment, in which the rotors are positioned in an array or grid pattern. The central rotor is labeled R41 to designate it as the primary rotor, because movement of the primary rotor R41 is induced by a force (e.g., electrical, mechanical or magnetic) from outside of the rotor arrangement, and movement of the primary rotor R41 induces the movement of the auxiliary rotors R42. As can be appreciated, the array can continue and can be larger than what is illustrated, for example having multiple rows with multiple rotors in each row. When a rotor is adjacent more than one other rotor, it can influence or be influenced by the motion of each of the rotors to which it is adjacent. It will be appreciated that the primary rotor may be positioned anywhere in the array, and there may be more than one primary rotor. The magnets M may be similar to the magnets described above.

Figure 5:
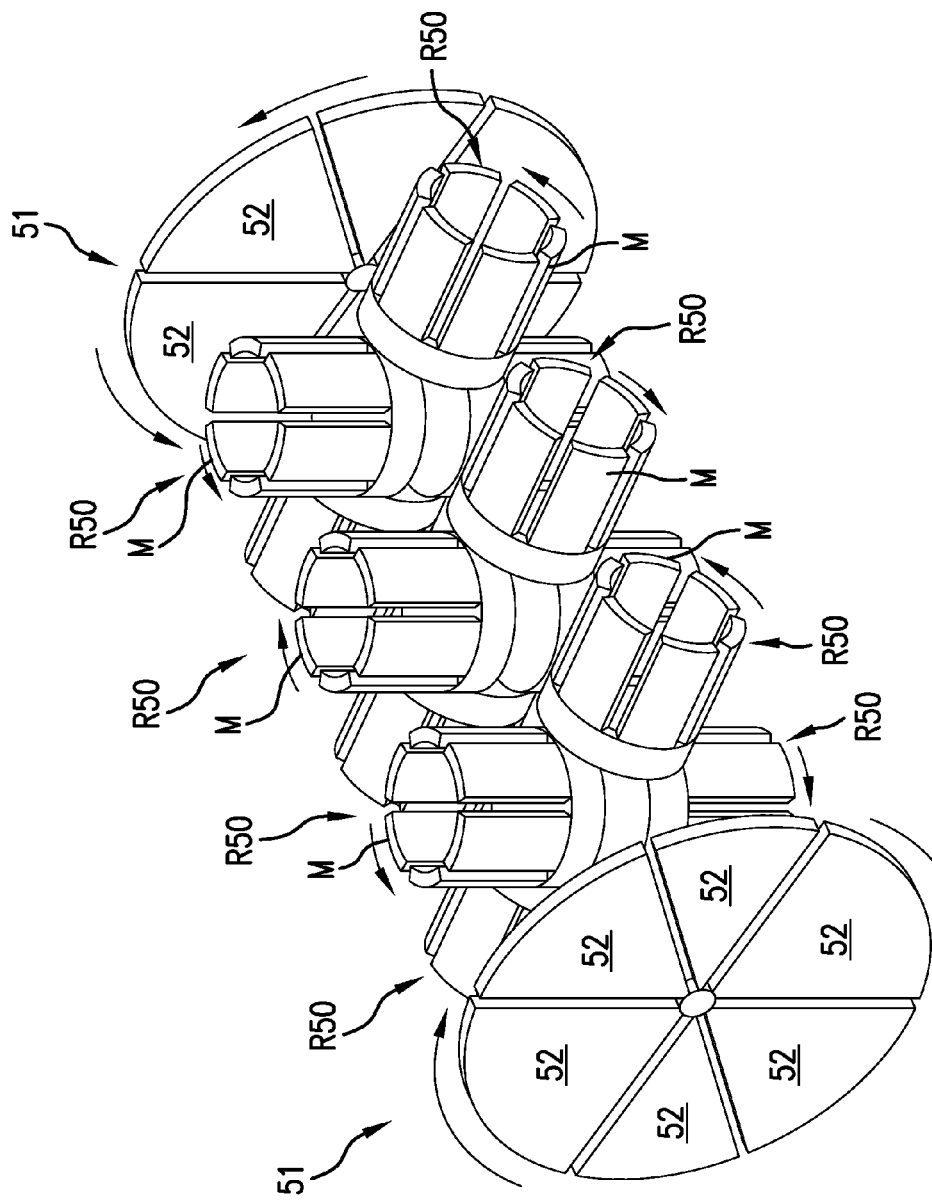
FIG. 5 shows an alternate arrangement in which the rotors are positioned to form a three-dimensional arrangement.

FIG. 5 shows another arrangement, in which the rotors are positioned to form a three-dimensional rotor array or arrangement. The arrangement includes four linear arrays of rotors R50 and two disks 51. The disks 51 have magnets 52 that alternate in polarity and are arranged on one or more axles to allow their rotation. The rotors R50 have magnets M similar to the magnets described above. In the illustrated example, each rotor R50 is adjacent not only to one or two rotors R50 in its own linear array but is also adjacent to the two rotors R50 that are in the adjacent linear arrays on either side. Each rotor R50 can influence or be influenced by the motion of each of the rotors R50 to which it is adjacent. In this arrangement, any of the rotors R50 can be induced to motion by a force from outside of the rotor arrangement, such that any of the rotors R50 can serve as the primary rotor(s) which initiate(s) the movement of the other rotors. One or both of the disks 51 can provide the force that induces movement of the primary rotor(s). It will be appreciated that a three-dimensional array such as the one illustrated in FIG. 5 allows transfer of rotational movement at ninety degrees or other angles, analogous to gears such as bevel gears and the like.

As discussed above, the various magnetic rotor arrangements as described herein may be implemented in different types of rotating machines, such as generators or motors. For example, in one arrangement suitable for use in a generator or motor, the primary rotor is centrally positioned, and the auxiliary rotors are positioned around the periphery of the primary rotor (such as in FIGS. 1 and 2). In another arrangement suitable for use in a generator or motor, two or more rotors are positioned in a linear arrangement such that their axes are all generally on a common line (such as in FIG. 3). In yet another arrangement suitable for use in a generator or motor, two or more rotors are positioned in an array or grid pattern (such as in FIG. 4). In yet another arrangement suitable for use in a generator or motor, two or more rotors are positioned to form a three-dimensional rotor array or arrangement (such as in FIG. 5). Any of these magnetic rotor arrangements may be used as a generator, with windings being used for generation of current from the rotation of one or more of the rotors. Any of these magnetic rotor arrangements may alternatively or additionally be used as a motor, with windings being used to drive one or more of the rotors.

Many other variations are possible. The armatures or windings associated with any or all of the rotors may be positioned on the inside or on the outside of the rotor. The holders of the rotating arrays of magnets may be of any suitable construction, including, for example, bearings as are known in the art. Grooves may be provided in the structure of the holders to accommodate the magnets so as to help secure them in place.

The cross-section of the magnets in the illustrated embodiments has one side that is straight and an opposite side that is curved, with the magnets arranged in the rotor so that the curved side faces inwardly and the straight side faces outwardly. Alternatively, both the outside surface and the inside surface can be straight, both can be curved, or they can be any other suitable shape.

The number of magnetic rotors that can be positioned in a single arrangement is unlimited. For example, for a particular application, it is possible to have dozens, hundreds or even more magnetic rotors as described herein in a single arrangement.

The foregoing embodiments are merely examples. Other embodiments are possible that incorporate one or more of the features and/or advantages of the above-described embodiments. This invention thus embraces other embodiments within the scope of the claims.

What is claimed is:

1. An electromagnetic system with magnetically coupled rotors comprising:
   a first magnetic assembly comprising a first rotor, the first rotor comprising a first array of permanent magnets, wherein the permanent magnets of the first rotor are arranged to provide alternating polarity around outside of the first rotor; and
   a second magnetic assembly comprising a second rotor, the second rotor comprising a second array of permanent magnets, wherein the permanent magnets of the second rotor are arranged to provide alternating polarity around outside of the second rotor;
   wherein the second magnetic assembly is positioned relative to the first magnetic assembly such that the second rotor is outside of the first rotor and such that the second array of permanent magnets of the second rotor is positioned to be magnetically influenced by the first array of permanent magnets of the first rotor;
   wherein the first rotor and the second rotor are arranged such that when the first rotor is rotated, the rotation of the first rotor magnetically induces rotation of the second rotor;
   wherein the first magnetic assembly further comprises a first fixed stator comprising a plurality of coils for carrying electric current, wherein the first fixed stator is positioned inside the first array of permanent magnets;
   wherein each permanent magnet in the first array of permanent magnets has an inwardly-facing side that faces inwardly toward the first fixed stator and an outwardly-facing side that faces outwardly away from the first fixed stator; and
   wherein each permanent magnet in the first array of permanent magnets is arranged such that when the first rotor is rotated, the inwardly-facing side of that permanent magnet electromagnetically interacts with the coils of the first fixed stator, and the outwardly-facing side of that permanent magnet magnetically interacts with the second array of permanent magnets.

2. An electromagnetic system according to claim 1, wherein the first array of permanent magnets of the first rotor generally forms an equiangular and equilateral polygon having an even number of sides.

3. An electromagnetic system according to claim 2, wherein the first array of permanent magnets of the first rotor forms one of a hexagon, octagon, decagon, or dodecagon.

4. An electromagnetic system according to claim 2, wherein each side of the polygon of the first rotor is formed by one permanent magnet.

5. An electromagnetic system according to claim 2, wherein each side of the polygon of the first rotor is formed by more than one permanent magnet.

6. An electromagnetic system according to claim 1, wherein the second array of permanent magnets of the second rotor forms an equiangular and equilateral polygon having an even number of sides.

7. An electromagnetic system according to claim 1, wherein the second magnetic assembly further comprises a second fixed stator comprising a plurality of coils for carrying electric current, wherein the second fixed stator is positioned inside the second array of permanent magnets;
   wherein each permanent magnet in the second array of permanent magnets has an inwardly-facing side that faces inwardly toward the second fixed stator and an outwardly-facing side that faces outwardly away from the second fixed stator; and
   wherein each permanent magnet in the second array of permanent magnets is arranged such that when the second rotor is rotated, the inwardly-facing side of that permanent magnet electromagnetically interacts with the coils of the second fixed stator, and the outwardly-facing side of that permanent magnet magnetically interacts with the first array of permanent magnets.

8. An electromagnetic system according to claim 1, further comprising:
   a third magnetic assembly comprising a third rotor, the third rotor comprising a third array of permanent magnets, wherein the permanent magnets of the third rotor are arranged to provide alternating polarity around outside of the third rotor;
   wherein the third magnetic assembly is positioned relative to the first magnetic assembly such that the third rotor is outside of the first rotor and such that the third array of permanent magnets of the third rotor is positioned to be magnetically influenced by the first array of permanent magnets of the first rotor; and
   wherein the first rotor and the third rotor are arranged such that when the first rotor is rotated, the rotation of the first rotor magnetically induces rotation of the third rotor.

9. An electromagnetic system according to claim 1, further comprising:
   a third magnetic assembly comprising a third rotor, the third rotor comprising a third array of permanent magnets, wherein the permanent magnets of the third rotor are arranged to provide alternating polarity around outside of the third rotor;

wherein the third magnetic assembly is positioned relative to the second magnetic assembly such that the third rotor is outside of the second rotor and such that the third array of permanent magnets of the third rotor is positioned to be magnetically influenced by the second array of permanent magnets of the second rotor; and wherein the second rotor and the third rotor are arranged such that when the second rotor is rotated, the rotation of the second rotor magnetically induces rotation of the third rotor.

10. A generator for generating electric current comprising:
a first magnetic assembly comprising a first fixed stator surrounded by a first rotor comprising a first array of permanent magnets, wherein the permanent magnets of the first rotor are arranged to provide alternating polarity around outside of the first rotor; and
a second magnetic assembly comprising a second rotor comprising a second array of permanent magnets, wherein the permanent magnets of the second rotor are arranged to provide alternating polarity around the outside of the second rotor;
wherein the first magnetic assembly is positioned relative to the second magnetic assembly such that the first rotor is outside of the second rotor and such that the first array of permanent magnets of the first rotor is positioned to be magnetically influenced by the second array of permanent magnets of the second rotor;
wherein the second rotor and the first rotor are arranged such that when the second rotor is rotated, the rotation of the second rotor magnetically induces rotation of the first rotor;
wherein the first fixed stator of the first magnetic assembly comprises a plurality of coils for carrying electric current, wherein the first fixed stator is positioned inside the first array of permanent magnets;
wherein each permanent magnet in the first array of permanent magnets has an inwardly-facing side that faces inwardly toward the first fixed stator and an outwardly-facing side that faces outwardly away from the first fixed stator; and
wherein each permanent magnet in the first array of permanent magnets is arranged such that when the first rotor is rotated, the inwardly-facing side of that permanent magnet electromagnetically interacts with the coils of the first fixed stator to induce an electrical current in the coils of the first fixed stator, and the outwardly-facing side of that permanent magnet magnetically interacts with the second array of permanent magnets such that the first array of permanent magnets is rotated by the rotation of the second array of permanent magnets.

11. A generator according to claim 10, wherein the first array of permanent magnets of the first rotor generally forms an equiangular and equilateral polygon having an even number of sides.

12. A generator according to claim 11, wherein each side of the polygon of the first rotor is formed by one permanent magnet.

13. A generator according to claim 11, wherein each side of the polygon of the first rotor is formed by more than one permanent magnet.

14. A generator according to claim 10, wherein the second array of permanent magnets of the second rotor forms an equiangular and equilateral polygon having an even number of sides.

15. A generator according to claim 10, further comprising:
a third magnetic assembly comprising a third rotor, the third rotor comprising a third array of permanent magnets, wherein the permanent magnets of the third rotor are arranged to provide alternating polarity around outside of the third rotor;
wherein the third magnetic assembly is positioned relative to the second magnetic assembly such that the third rotor is outside of the second rotor and such that the third array of permanent magnets of the third rotor is positioned to be magnetically influenced by the second array of permanent magnets of the second rotor; and
wherein the second rotor and the third rotor are arranged such that when the second rotor is rotated, the rotation of the second rotor magnetically induces rotation of the third rotor.

16. A generator according to claim 15, wherein the third magnetic assembly further comprises a third fixed stator comprising a plurality of coils for carrying electric current, wherein the third fixed stator is positioned inside the third array of permanent magnets;
wherein each permanent magnet in the third array of permanent magnets has an inwardly-facing side that faces inwardly toward the third fixed stator and an outwardly-facing side that faces outwardly away from the third fixed stator; and
wherein each permanent magnet in the third array of permanent magnets is arranged such that when the third rotor is rotated, the inwardly-facing side of that permanent magnet electromagnetically interacts with the coils of the third fixed stator, and the outwardly-facing side of that permanent magnet magnetically interacts with the second array of permanent magnets.

17. A generator according to claim 10, further comprising:
a third magnetic assembly comprising a third rotor, the third rotor comprising a third array of permanent magnets, wherein the permanent magnets of the third rotor are arranged to provide alternating polarity around outside of the third rotor;
wherein the third magnetic assembly is positioned relative to the first magnetic assembly such that the third rotor is outside of the first rotor and such that the third array of permanent magnets of the third rotor is positioned to be magnetically influenced by the first array of permanent magnets of the first rotor; and
wherein the first rotor and the third rotor are arranged such that when the first rotor is rotated, the rotation of the first rotor magnetically induces rotation of the third rotor.

18. A generator according to claim 17, wherein the third magnetic assembly further comprises a third fixed stator comprising a plurality of coils for carrying electric current, wherein the third fixed stator is positioned inside the third array of permanent magnets;
wherein each permanent magnet in the third array of permanent magnets has an inwardly-facing side that faces inwardly toward the third fixed stator and an outwardly-facing side that faces outwardly away from the third fixed stator; and
wherein each permanent magnet in the third array of permanent magnets is arranged such that when the third rotor is rotated, the inwardly-facing side of that permanent magnet electromagnetically interacts with the coils of the third fixed stator, and the outwardly-facing side of that permanent magnet magnetically interacts with the first array of permanent magnets.

\* \* \* \* \*

UNITED STATES PATENT AND TRADEMARK OFFICE
CERTIFICATE OF CORRECTION

PATENT NO. : 9,954,405 B2
APPLICATION NO. : 14/886592
DATED : April 24, 2018
INVENTOR(S) : Evan Levy Page 1 of 1

It is certified that error appears in the above-identified patent and that said Letters Patent is hereby corrected as shown below:

On the Title Page

Item (73) Assignee -- Please replace "HEALEY MAGNETS, LLC" with "HEALEY MAGNETICS, LLC" --

Signed and Sealed this
Fourth Day of September, 2018

Andrei Iancu
*Director of the United States Patent and Trademark Office*